United States Patent
Goto et al.

(10) Patent No.: US 6,736,354 B2
(45) Date of Patent: May 18, 2004

(54) AIRPLANE FUEL SUPPLY SYSTEM AND AIRPLANE WING PIPELINE ASSEMBLY METHOD

(75) Inventors: Kenichi Goto, Wako (JP); Toshiaki Fujii, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/356,616

(22) Filed: Feb. 3, 2003

(65) Prior Publication Data

US 2003/0218098 A1 Nov. 27, 2003

(30) Foreign Application Priority Data

Feb. 4, 2002 (JP) ........................................ 2002-026626
Feb. 4, 2002 (JP) ........................................ 2002-026627

(51) Int. Cl.$^7$ ............................................ B64D 37/00
(52) U.S. Cl. ............................... 244/135 C; 60/39.15; 137/572
(58) Field of Search ......................... 244/135 R–135 C; 60/39.15, 734, 739; 137/566, 571, 572, 255, 263, 266

(56) References Cited

U.S. PATENT DOCUMENTS

| | | | | |
|---|---|---|---|---|
| 2,516,150 A | * | 7/1950 | Samiran | 137/208 |
| 2,519,968 A | * | 8/1950 | Jordan | 137/266 |
| 4,591,115 A | * | 5/1986 | DeCarlo | 244/135 C |
| 4,918,619 A | * | 4/1990 | Orloff et al. | 702/52 |
| 5,321,945 A | * | 6/1994 | Bell | 60/39.15 |
| 5,660,358 A | * | 8/1997 | Grafwallner et al. | 244/135 R |

* cited by examiner

*Primary Examiner*—Galen Barefoot
(74) *Attorney, Agent, or Firm*—Birch, Stewart Kolasch & Birch, LLP

(57) ABSTRACT

An airplane fuel supply system includes a wing fuel tank that is formed from a wing tip fuel tank having a wing tip fuel pump; a central fuel tank having a central fuel pump; and a wing root fuel tank having a wing root fuel pump. Fuel movement from the wing tip fuel tank to the central fuel tank is allowed by a flapper valve, and fuel movement from the central fuel tank to the wing root fuel tank is allowed by another flapper valve. When the fuel delivery volume of the wing tip fuel pump is represented by $Vt$, the fuel delivery volume of the central fuel pump is represented by $Vc$, the fuel delivery volume of the wing root fuel pump is represented by $Vr$, and the fuel delivery volume from a collector tank to the engine is represented by $Ve$, the fuel delivery volumes $Vt$, $Vc$, $Vr$, and $Ve$ are set so as to satisfy the relationships $Vr>Ve$, $Vt+Vc>Ve$, and $Vc<Ve$. This can minimize the size of the fuel pumps for supplying fuel from the airplane wing fuel tank to the engine.

3 Claims, 6 Drawing Sheets

WHEN BANKING TO RIGHT

WHEN BANKING TO LEFT

AIRPLANE FUEL SUPPLY SYSTEM AND AIRPLANE WING PIPELINE ASSEMBLY METHOD

BACKGROUND OF THE INVENTION

1. Field of the Invention

The present invention relates to an airplane fuel supply system that supplies fuel within a wing fuel tank to an engine via a collector tank, the wing fuel tank including a wing tip fuel tank, a central fuel tank, and a wing root fuel tank. Furthermore, the present invention relates to a method for assembling a wing pipeline that extends in the span direction and runs through a partition provided within an airplane main wing.

2. Description of the Related Art

A wing fuel tank provided in an airplane main wing has a plurality of sections that are divided in the span direction and communicate with each other. A fuel pump for supplying fuel to an engine is provided in each of the sections. When the airplane banks laterally in a state in which there is little fuel remaining in the wing fuel tank, fuel moves between the plurality of sections of the wing fuel tank, leading to a possibility that the fuel pump in an empty section does not function. Conventionally, the fuel delivery volume (discharge capacity) of each of the fuel pumps provided in the respective sections is set larger than the fuel delivery volume that is necessary to run the engine so that the engine can run when at least one fuel pump operates.

However, providing a plurality of fuel pumps corresponding to a plurality of sections of a wing fuel tank and setting the discharge capacity of each fuel tank larger than the fuel delivery volume required by the engine as in the conventional arrangement, make the total discharge capacity of the plurality of fuel pumps extremely large.

Furthermore, since a fuel supply system wing pipeline and a vent system wing pipeline are provided in a fuel tank disposed within an airplane main wing and these wing pipelines are long members extending in the wingspan direction, it is impossible to assemble the entire pipelines in one step through an access hole provided in the main wing surface. Conventionally, a long wing pipeline is divided into a plurality of pipelines, the divided pipelines are inserted respectively through a plurality of access holes provided in the main wing surface, and they are then integrally joined via joints within the main wing.

However, it is difficult to carry out the work to join the plurality of pipelines within the main wing through small access holes; not only are large amounts of labor and time required, but also the reliability of seals in the joined areas deteriorates, leading to the possibility of fuel and air leaks. If the size and the number of access holes are increased in order to avoid the above, problems such as increases in the weight and air resistance occur.

SUMMARY OF THE INVENTION

The present invention has been achieved in view of the above-mentioned circumstances, and it is a first object thereof to reduce the weight and the pump drive force of a fuel pump by minimizing the size thereof while ensuring that a required amount of fuel is supplied to an engine.

Furthermore, it is a second object of the present invention to carry out the work of assembling a wing pipeline within an airplane main wing easily and reliably.

In order to accomplish the first object, in accordance with a first aspect of the present invention, there is proposed an airplane fuel supply system that includes a wing fuel tank formed from a wing tip fuel tank, a central fuel tank, and a wing root fuel tank which are disposed within an airplane main wing, a flapper valve that allows fuel movement from the wing tip fuel tank to the central fuel tank and restricts fuel movement in the opposite direction, another flapper valve that allows fuel movement from the central fuel tank to the wing root fuel tank and restricts fuel movement in the opposite direction, a collector tank that supplies fuel to an engine, a wing tip fuel pump that supplies fuel within the wing tip fuel tank to the collector tank, a central fuel pump that supplies fuel within the central fuel tank to the collector tank, and a wing root fuel pump that supplies fuel within the wing root fuel tank to the collector tank, and when the fuel delivery volume of the wing tip fuel pump is represented by $Vt$, the fuel delivery volume of the central fuel pump is represented by $Vc$, the fuel delivery volume of the wing root fuel pump is represented by $Vr$, and the fuel delivery volume from the collector tank to the engine is represented by $Ve$, the fuel delivery volumes $Vt$, $Vc$, $Vr$, and $Ve$ are set so as to satisfy relationships $Vr>Ve$, $Vt+Vc>Ve$, and $Vc<Ve$.

In accordance with such an arrangement, the fuel delivery volume $Vt$ of the wing tip fuel pump, the fuel delivery volume $Vc$ of the central fuel pump, the fuel delivery volume $Vr$ of the wing root fuel pump, and the fuel delivery volume $Ve$ from the collector tank to the engine are set so as to satisfy the relationships $Vr>Ve$, $Vt+Vc>Ve$, and $Vc<Ve$. Therefore, when the airframe banks laterally in one direction causing the flapper valves to open and the fuel to collect in the wing root fuel tank, the fuel can be supplied to the engine without any problem by means of the wing root fuel pump whose fuel delivery volume $Vr$ is larger than the fuel delivery volume $Ve$ required by the engine; and when the airframe banks laterally in the other direction causing the flapper valves to close and the fuel to be trapped in the wing tip fuel tank, the central fuel tank, and the wing root fuel tank, the fuel can be supplied to the engine without any problem by means of the wing tip fuel pump and the central fuel pump whose fuel delivery volumes $Vt$, $Vc$ are in total larger than the fuel delivery volume $Ve$ required by the engine. In this way, at least the fuel delivery volume $Vc$ of the central fuel pump can be made smaller than the fuel delivery volume $Ve$ to the engine while enabling the supply of the required volume of fuel to the engine, thereby reducing the size of the central fuel pump.

Furthermore, in accordance with a second aspect of the present invention, in addition to the first aspect, there is proposed an airplane fuel supply system in which the fuel delivery volumes $Vt$, $Vc$ are set so as to satisfy a relationship $Vt=Vc$.

In accordance with such an arrangement, since the fuel delivery volume $Vt$ of the wing tip fuel pump and the fuel delivery volume $Vc$ of the central fuel pump are set equal, the size of the wing tip fuel pump can be reduced in the same way as for the central fuel pump. Moreover, the use of identical specifications for the wing tip fuel pump and the central fuel pump can achieve a reduction in cost.

In the above-mentioned first and second aspects, a left collector tank TCL and a right collector tank TCR of an embodiment correspond to the collector tank of the present invention, a left wing fuel tank and a right wing fuel tank of the embodiment correspond to the wing fuel tank of the present invention, and a left main wing WL and a right main wing WR of the embodiment correspond to the main wing of the present invention.

Moreover, in order to accomplish the second object of the present invention, in accordance with a third aspect of the present invention, there is proposed an airplane wing pipeline assembly method for assembling a wing pipeline that runs through a partition provided within a main wing of an airplane and extends in the span direction, in which a wing pipeline that is made into a linear unit in advance is inserted in the span direction through an access hole provided in a wing tip and is fixed in a predetermined position.

In accordance with such an arrangement, the wing pipeline that is made into a linear unit in advance is inserted in the span direction through the access hole provided in the wing tip and fixed in the predetermined position. Therefore, the work of joining a plurality of divided pipelines within a main wing can be reduced, thereby greatly improving the workability, and the improved workability can enhance the reliability of the wing pipeline, thereby preventing the occurrence of fuel leakage and air leakage. Moreover, the size and the number of access holes provided on the main wing surface can be reduced, thus contributing to a reduction in the weight and the air resistance.

In the third aspect, a vent line 57 of the embodiment corresponds to the wing pipeline of the present invention, and a left main wing WL and a right main wing WR of the embodiment correspond to the main wing of the present invention.

The above-mentioned objects, other objects, characteristics, and advantages of the present invention will become apparent from an explanation of a preferred embodiment that will be described in detail below by reference to the attached drawings.

BRIEF DESCRIPTION OF THE DRAWINGS

FIG. 1 is a diagram showing an airplane engine fuel supply system.

FIG. 2 is an enlarged view of section 2 in FIG. 1.

FIG. 3 is a diagram showing an airplane fuel tank vent system.

FIG. 4 is an enlarged view of section 4 in FIG. 3.

FIG. 5 is an enlarged cross-sectional view along line 5—5 in FIG. 4.

FIG. 6 is a view for explaining operation when banking to the right.

FIG. 7 is a view for explaining operation when banking to the left.

DESCRIPTION OF PREFERRED EMBODIMENT

An embodiment of the present invention is explained below by reference to the attached drawings.

Figure 1:
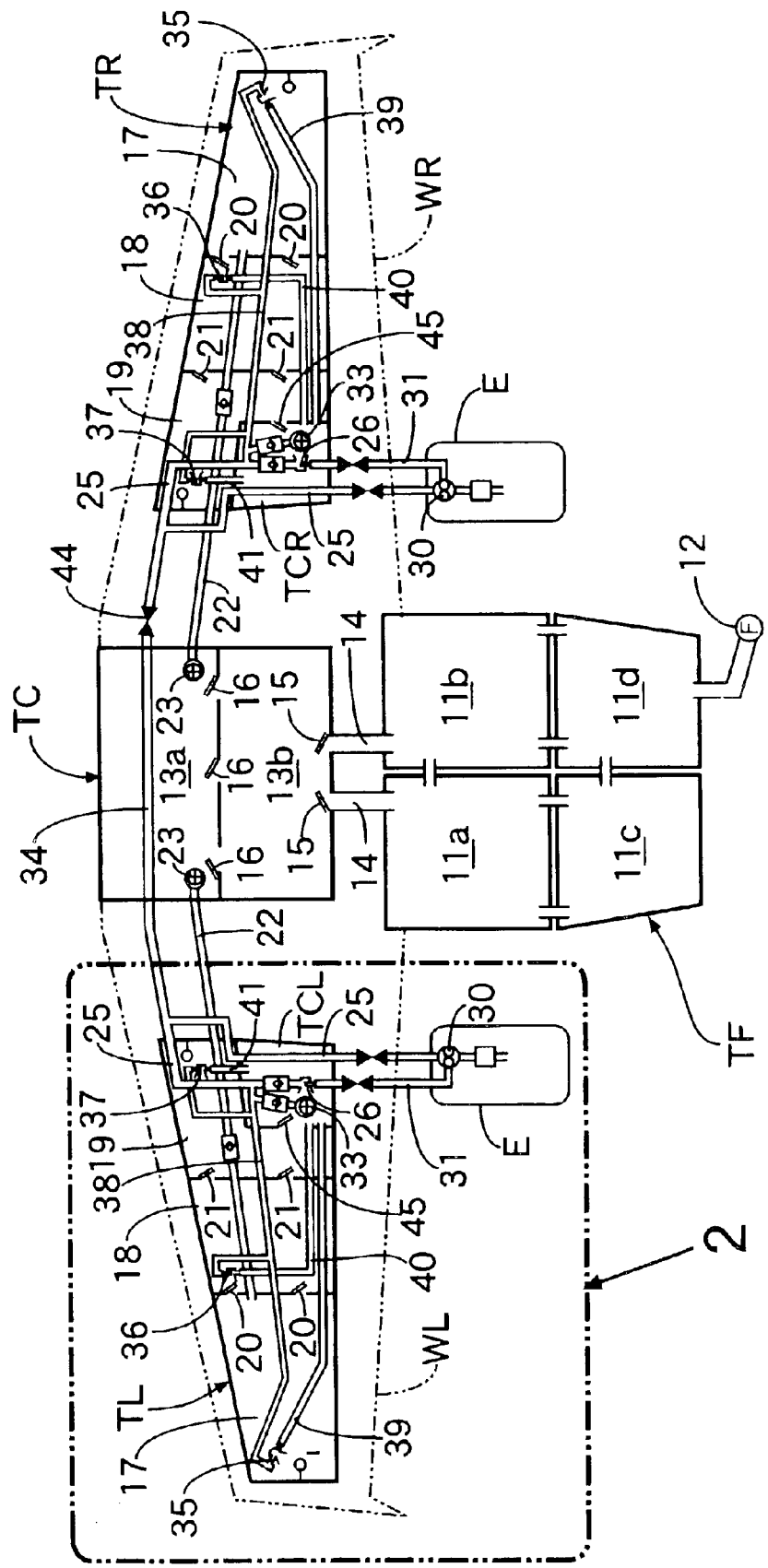
FIGS. 1 to 7 illustrate one embodiment of the present invention.
Figure 2:
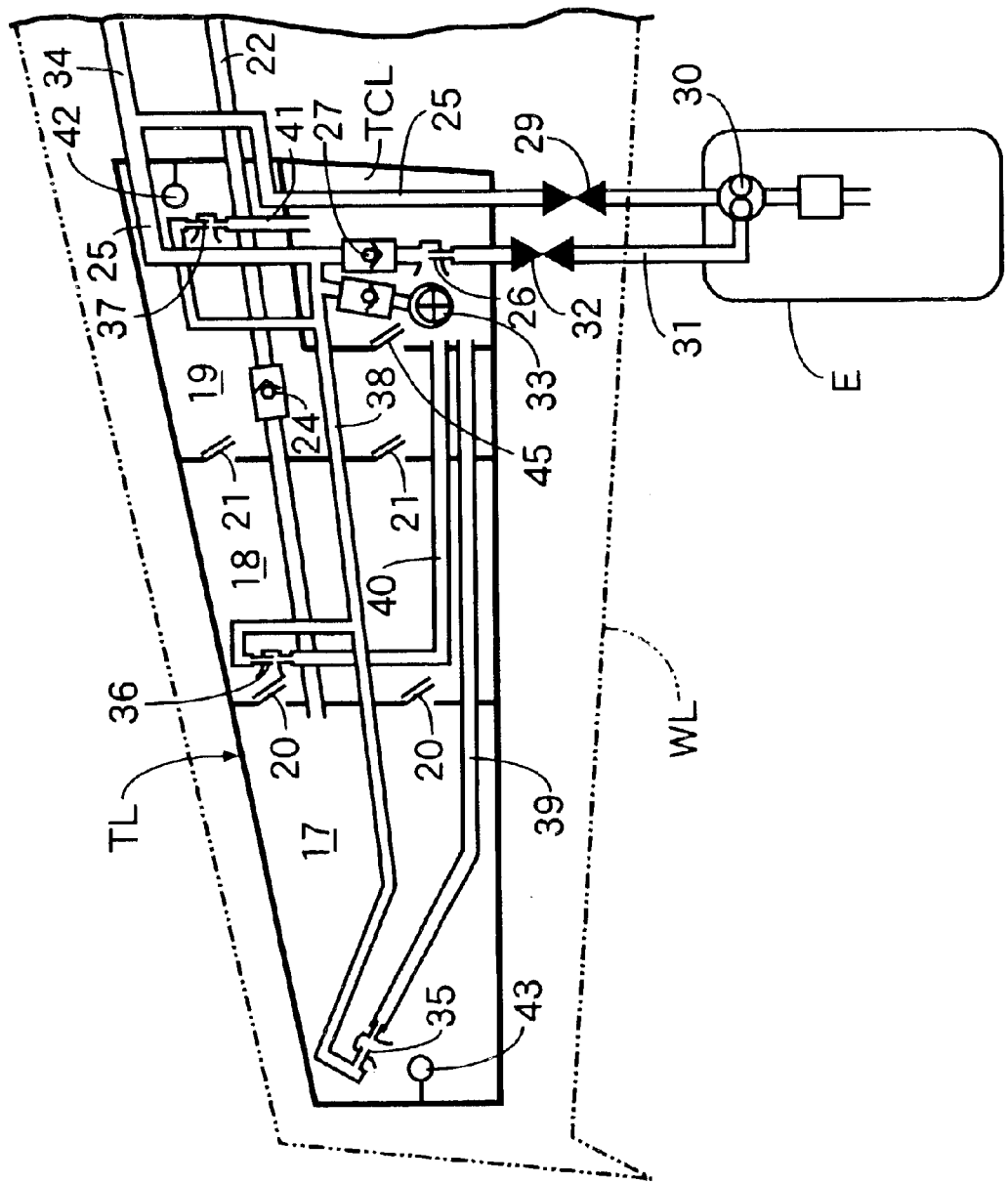

As shown in FIGS. 1 and 2, fuel supply systems for supplying fuel to engines E mounted in left and right main wings WL, WR of an airplane, include a fuselage fuel tank TF provided in a fuselage, a central wing fuel tank TC provided between the left and right main wings WL, WR, a left wing fuel tank TL provided in the left main wing WL, a right wing fuel tank TR provided in the right main wing WR, a left collector tank TCL provided in the left main wing WL, and a right collector tank TCR provided in the right main wing WR. The fuselage fuel tank TF has four sections 11a, 11b, 11c, 11d that communicate with each other, and a fuel inlet 12 is connected to one thereof, that is, the section 11d. The central wing fuel tank TC has two sections 13a, 13b; the section 13b on the rear side is connected to each of the sections 11a, 11b on the front side of the fuselage fuel tank TF via communication passages 14. A flapper valve 15 is provided in each of the communication passages 14, the flapper valves 15 allowing fuel movement from the fuselage fuel tank TF to the central wing fuel tank TC and restricting fuel movement in the opposite direction. Provided in the central wing fuel tank TC are flapper valves 16 that allow fuel movement from the section 13b on the rear side to the section 13a on the front side and restrict fuel movement in the opposite direction.

Since the fuel supply system for the left main wing WL and the fuel supply system for the right main wing WR have substantially identical structures, the structure of the fuel supply system for the left main wing WL is mainly explained below.

The left wing fuel tank TL, which is an integral tank, can be sectioned into a wing tip fuel tank 17 positioned on the wing tip side, a wing root fuel tank 19 positioned on the wing root side, and a central fuel tank 18 positioned between the wing tip fuel tank 17 and the wing root fuel tank 19. The left collector tank TCL is provided so as to adjoin the wing root fuel tank 19, and one flapper valve 45 is provided between the wing root fuel tank 19 and the left collector tank TCL, the flapper valve 45 allowing fuel movement from the wing root fuel tank 19 to the left collector tank TCL and restricting fuel movement in the opposite direction. Provided between the wing tip fuel tank 17 and the central fuel tank 18 are two flapper valves 20 allowing fuel movement from the wing tip fuel tank 17 to the central fuel tank 18 and restricting fuel movement in the opposite direction. Provided between the central fuel tank 18 and the wing root fuel tank 19 are two flapper valves 21 allowing fuel movement from the central fuel tank 18 to the wing root fuel tank 19 and restricting fuel movement in the opposite direction.

A fuel filler passage 22 extends in the span direction from the front section 13a of the central wing fuel tank TC and reaches the wing tip fuel tank 17 of the left wing fuel tank TL. The fuel filler passage 22 has a fuel filler pump 23, which is a centrifugal pump, provided at its entrance, and a check valve 24 provided in its middle section, the check valve 24 allowing fuel movement from the central wing fuel tank TC to the wing tip fuel tank 17 and restricting fuel movement in the opposite direction. The left collector tank TCL and the engine E are connected to each other via a fuel supply passage 25; a main pump 26, which is a jet pump, is provided at the upstream end of the fuel supply passage 25, and a check valve 27, a shutoff valve 29, and an engine pump 30, which is a gear pump, are provided on the downstream side of the main pump 26. A fuel return passage 31 extending from the engine pump 30 is connected to the main pump 26 via a shutoff valve 32. Connected to the fuel supply passage 25 is a sub pump 33, which is a centrifugal pump, disposed within the left collector tank TCL. The fuel supply passages 25 of the left and right main wings WL, WR are connected to each other via a communication passage 34 having a shutoff valve 44.

Disposed in the wing tip fuel tank 17, the central fuel tank 18, and the wing root fuel tank 19 of the left wing fuel tank TL are respectively a wing tip fuel pump 35, a central fuel pump 36, and a wing root fuel pump 37, which are jet pumps. A fuel return passage 38 branching from the fuel supply passage 25 is connected to the wing tip fuel pump 35, the central fuel pump 36, and the wing root fuel pump 37. The wing tip fuel pump 35, the central fuel pump 36, and the wing root fuel pump 37 are connected to the left collector tank TCL via fuel transfer passages 39, 40, 41. The wing tip fuel pump 35 and the central fuel pump 36 are preferably disposed at positions, closer to the wing tip, of the wing tip fuel tank 17 and the central fuel tank 18. The wing root fuel pump 37 is preferably disposed at a position, closer to the wing root, of the wing root fuel tank 19.

Figure 3:
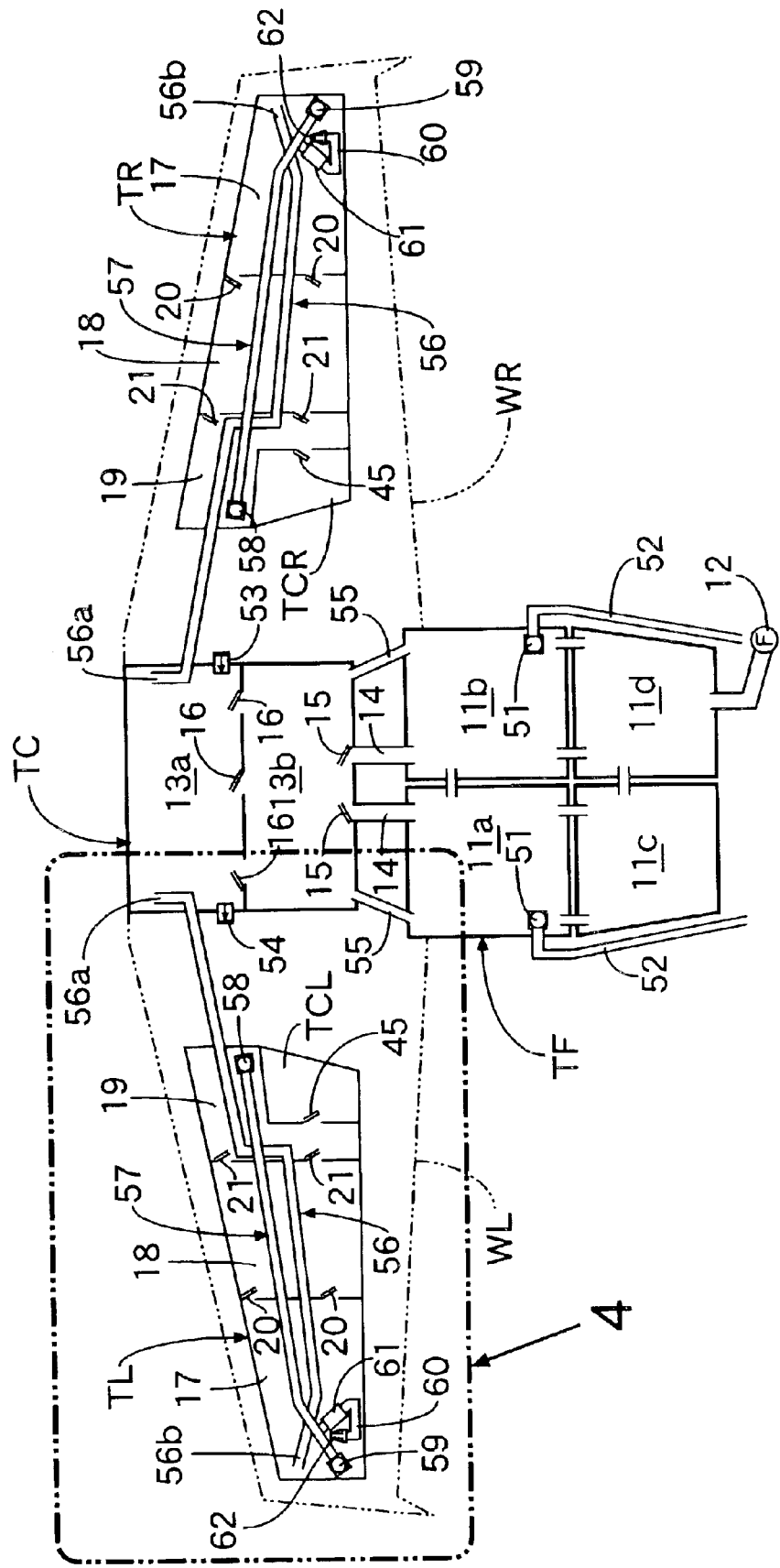
Figure 4:
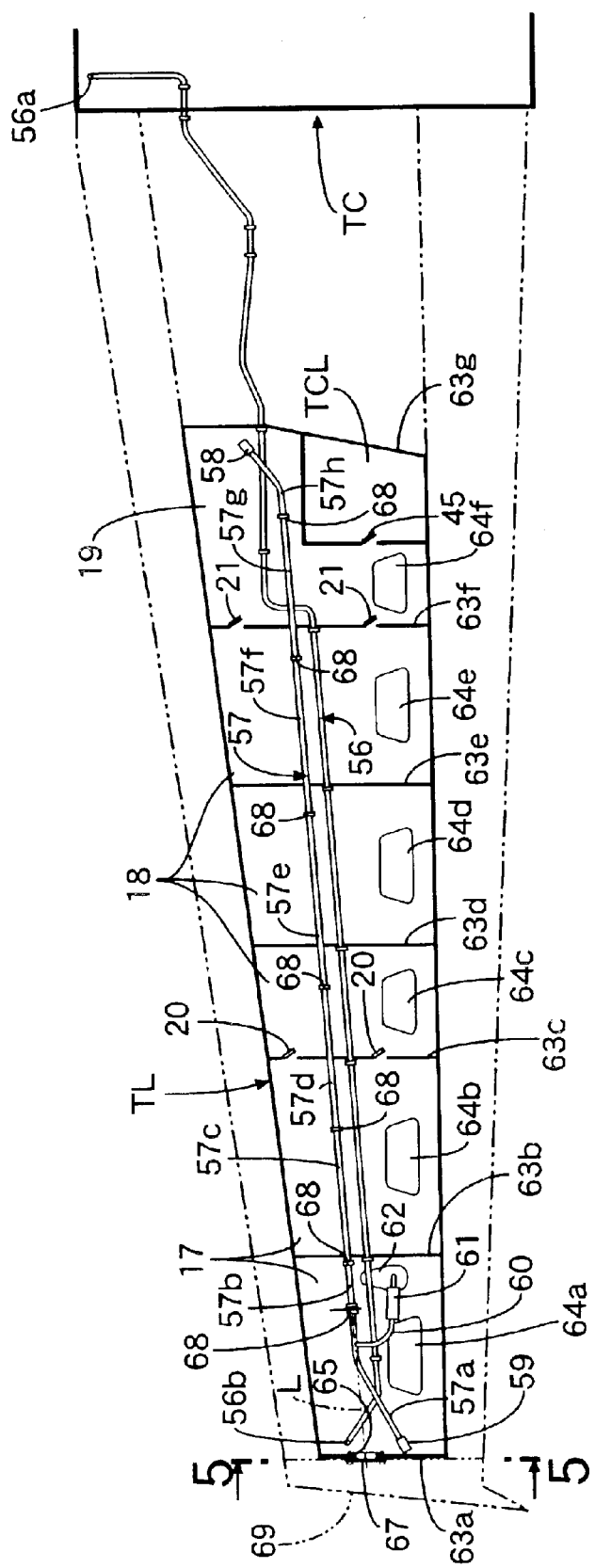
Figure 5:
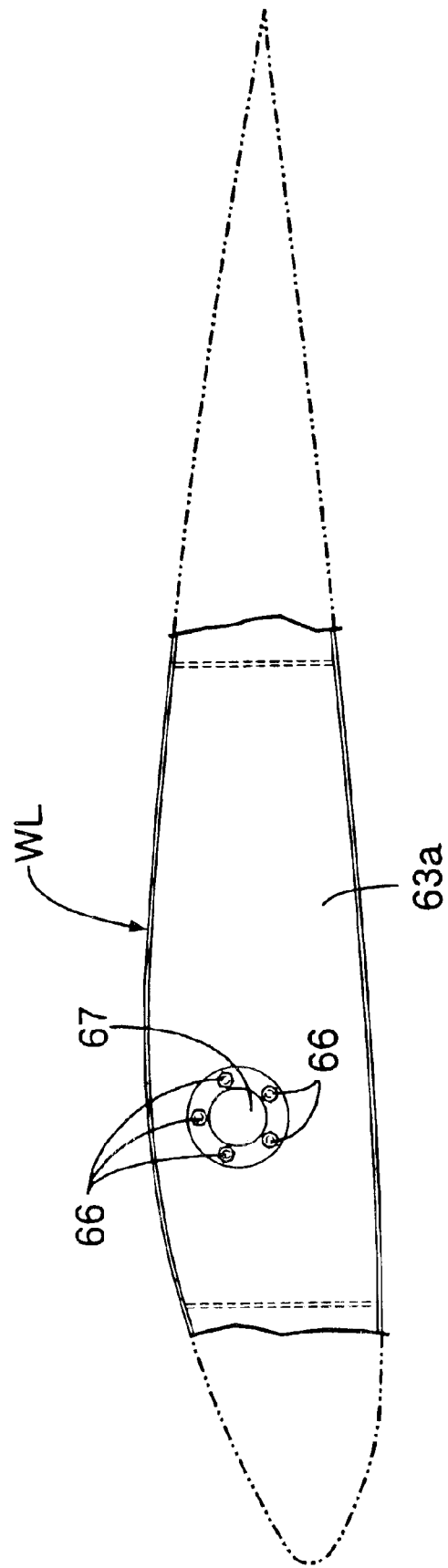

The structure of a fuel tank vent system is now explained by reference to FIGS. 3 to 5. Since the vent system for the left main wing WL and the vent system for the right main wing WR have substantially identical structures, the structure of the vent system for the left main wing WL is mainly explained below.

An upper space of the fuselage fuel tank TF communicates with the atmosphere via float valves 51 and vent lines 52. An upper space of the front section 13a of the central wing fuel tank TC communicates with the atmosphere via a vacuum relief valve 53 and a pressure relief valve 54, which are check valves. The upper space of the fuselage fuel tank TF and an upper space of the rear section 13b of the central wing fuel tank TC communicate with each other via a pair of tank interconnect lines 55.

Disposed in the span direction within the left main wing WL is a tank interconnect line 56 whose inner end communication opening 56a opens in the upper space of the front section 13a of the central wing fuel tank TC and whose outer end communication opening 56b opens in an upper space of the wing tip fuel tank 17 of the left wing fuel tank TL. Disposed also in the span direction in the left wing fuel tank TL is a vent line 57 having, at its inner end, a float valve 58 positioned in an upper space of the wing root fuel tank 19 and, at its outer end, a float valve 59 positioned in the upper space of the wing tip fuel tank 17. A branch line 60 branching from the vent line 57 at a position close to the float valve 59 on the wing tip side communicates with an air scoop 62 provided on the lower surface of the left main wing WL via a flame arrestor 61 for preventing fire due to a lightning strike.

The interior of the left wing fuel tank TL is divided by a plurality of partitions 63a to 63g that form ribs of the left main wing WL; the tank interconnect line 56 runs through the partitions 63b to 63g, and the vent line 57 runs through the partitions 63b to 63f. Provided between adjoining partitions 63a to 63g are access panels 64a to 64f for opening and closing access holes provided in the lower surface of the left main wing WL for assembly and maintenance of the fuel supply system and the vent system. Provided in the partition 63a closest to the wing tip is a circular access hole 65, which is opened and closed by means of an access panel 67 that can be attached and removed using bolts 66.

The vent line 57 is formed by integrally joining eight pipes 57a to 57h via joints 68 and is fixed in the interior of the left wing fuel tank TL by means of a clamp (not illustrated). Among the eight pipes 57a to 57h, the two end pipes 57a, 57h are bent, but the inner six pipes 57b to 57g are connected linearly. The access hole 65 provided in the partition 63a closest to the wing tip is positioned on the axis L of the linearly connected six pipes 57b to 57g.

The operation of the embodiment of the present invention having the above-mentioned arrangement is now explained.

Fuel that is supplied through the fuel inlet 12 fills the four sections 11a to 11d of the fuselage fuel tank TF, flows into the rear section 13b of the central wing fuel tank TC via the communication passages 14 and the flapper valves 15, and flows therefrom into the front section 13a via the flapper valves 16. The fuel in the front section 13a of the central wing fuel tank TC is supplied to the wing tip fuel tank 17 of the left wing fuel tank TL via the check valve 24 of the fuel filler passage 22 by means of the fuel filler pump 23, supplied therefrom to the central fuel tank 18 via the flapper valves 20, supplied therefrom to the wing root fuel tank 19 via the flapper valves 21, and supplied therefrom to the left collector tank TCL via the flapper valve 45, and all the fuel tanks are thus filled with fuel.

The fuel filler pump 23 operates not only for initially supplying fuel to the left wing fuel tank TL but also in response to consumption of the fuel within the left wing fuel tank TL by the engine E. Specifically, when a float switch 42 provided in the wing root fuel tank 19, which is placed at the lowest position within the left wing fuel tank TL, is turned OFF, the fuel filler pump 23 operates to supply the fuel to the wing tip fuel tank 17, and when a float switch 43 provided in the wing tip fuel tank 17, which is placed at the highest position, is turned ON, the fuel filler pump 23 stops operating and supplying fuel.

The fuel within the wing tip fuel tank 17, the central fuel tank 18, and the wing root fuel tank 19 of the left wing fuel tank TL is supplied to the left collector tank TCL via the fuel transfer passages 39, 40, 41 by means of the wing tip fuel pump 35, the central fuel pump 36, and the wing root fuel pump 37. The fuel within the left collector tank TCL is pressure-fed to the fuel supply passage 25 by means of the main pump 26 and supplied to the engine E via the check valve 27, the shutoff valve 29, and the engine pump 30. The engine pump 30 supplies a predetermined amount of fuel to the engine E under a predetermined pressure. Surplus fuel is returned to the main pump 26 via the fuel return passage 31 and operates the main pump 26, which is a jet pump. A portion of the fuel discharged by the main pump 26 is supplied to the wing tip fuel pump 35, the central fuel pump 36, and the wing root fuel pump 37 via the fuel return passage 38 branching from the fuel supply passage 25, and operates the wing tip fuel pump 35, the central fuel pump 36, and the wing root fuel pump 37, which are jet pumps.

When the engine E is starting and the engine pump 30 is not yet operating, or when the main pump 26 is out of order, the sub pump 33 operates and provides a supply of fuel to the engine E and a supply of fuel for operating the wing tip fuel pump 35, the central fuel pump 36, and the wing root fuel pump 37. When one of the fuel supply systems for the left and right main wings WL, WR is out of order, opening the shutoff valve 44 provided in the communication passage 34 that provides a connection between the left and right fuel supply passages 25 can supply fuel to the engine E on the side where the fuel supply system is out of order.

Figure 6:
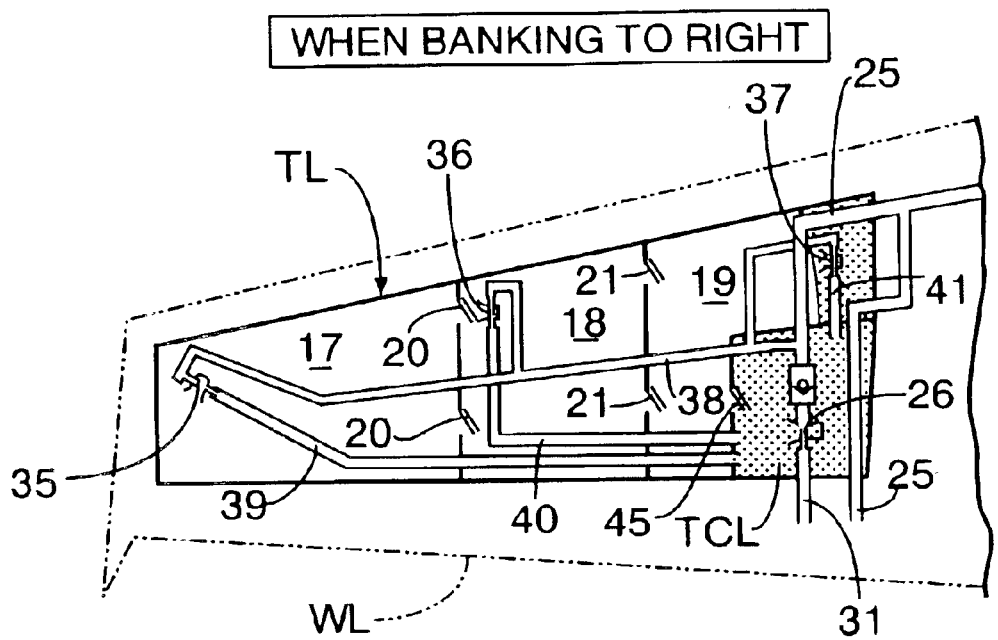

Suppose that the airframe banks to the right as shown in FIG. 6 when the fuselage fuel tank TF and the wing central fuel tank TC become empty due to consumption of fuel by the engine E and there is little fuel remaining in the left wing fuel tank TL. When the airframe banks to the right, the fuel remaining in the wing tip fuel tank 17 and the central fuel tank 18 of the left wing fuel tank TL passes through the flapper valves 20 and 21 and flows into the wing root fuel tank 19. As a result, the wing tip fuel pump 35 and the central fuel pump 36 stop functioning, and only the wing root fuel pump 37 provided closer to the wing root in the wing root fuel tank 19 and the flapper valve 45 supply fuel to the left collector tank TCL. In particular, since fuel might not be able to pass through the flapper valve 45 depending on the position at which the flapper valve 45 is placed, the fuel delivery volume Vr of the wing root fuel pump 37 is set so that it exceeds the fuel delivery volume Ve that should be supplied to the engine E from the left collector tank TCL (Vr>Ve). In this way, even when the airframe banks to the right with a small amount of residual fuel, fuel can be supplied to the engine E of the left main wing WL without problems.

Figure 7:
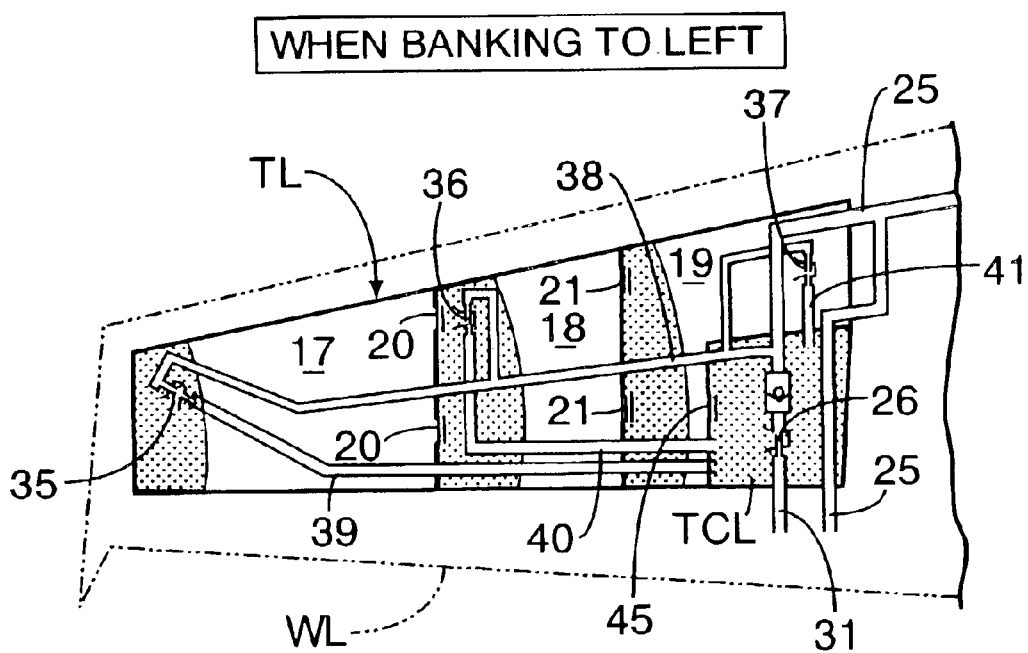

Conversely, when the airframe banks to the left as shown in FIG. 7, since movement of the fuel remaining in the wing tip fuel tank 17, the central fuel tank 18, and the wing root fuel tank 19 is blocked by the flapper valves 20 and 21, the fuel collects in the wing tip sides of the wing tip fuel tank 17, the central fuel tank 18, and the wing root fuel tank 19. Since the wing tip fuel pump 35 and the central fuel pump 36 are provided at the positions, closer to the wing tip, of the wing tip fuel tank 17 and the central fuel tank 18, at least the wing tip fuel pump 35 and the central fuel pump 36 can function and supply fuel to the left collector tank TCL.

That is, when the airframe banks to the left, at least the wing tip fuel pump 35 and the central fuel pump 36 function, and it is therefore unnecessary to set each of the fuel delivery volumes Vt, Vc of the wing tip fuel pump 35 and the central fuel pump 36 so that they are equal to or larger than the fuel delivery volume Ve required by the engine E, if the total of the fuel delivery volume Vt of the wing tip fuel pump 35 and the fuel delivery volume Vc of the central fuel pump 36 exceeds the fuel delivery volume Ve required by the engine E (Vt+Vc>Ve). Specifically, the system is set so that Vc<Ve and Vt=Vc. In this way, at least the fuel delivery volume Vc of the central fuel pump 36 can be set smaller than the fuel delivery volume Ve required by the engine E, so that the size of the central fuel pump 36 can be reduced. Setting Vt=Vc can reduce the size of the wing tip fuel pump 35 in the same manner as for the central fuel pump 36. Furthermore, using identical specifications for the wing tip fuel pump 35 and the central fuel pump 36 can contribute to a reduction in cost.

The fuel supply system on the left main wing WL side has been mainly explained above, but the operation of the fuel supply system on the right main wing WR side is the same.

When fuel is supplied to the fuselage fuel tank TF, the central wing fuel tank TC, the left wing fuel tank TL, and the right wing fuel tank TR, the air expelled by the fuel from the left wing fuel tank TL and the right wing fuel tank TR is discharged to the atmosphere from the opened float valves 58 and 59 via the vent lines 57, the branch lines 60, and the air scoops 62, and the air expelled by the fuel from the fuselage fuel tank TF and the central wing fuel tank TC is discharged to the atmosphere from the opened float valves 51 via the vent lines 52.

When the amount of fuel in the fuselage fuel tank TF, the central wing fuel tank TC, the left wing fuel tank TL, and the right wing fuel tank TR decreases due to running of the engines E, air is taken in through the air scoops 62 and supplied to the left wing fuel tank TL and the right wing fuel tank TR via the branch lines 60, the vent lines 57, and the opened float valves 58 and 59, and air is also supplied to the fuselage fuel tank TF and the central wing fuel tank TC via the vent lines 52 and the opened float valves 51, thereby preventing the generation of negative pressure within the fuel tanks. When the fuel level within the fuel tanks increases, the float valves 51, 58 and 59 close, thereby preventing fuel from being discharged from the vent lines 52 and 57.

An imbalance in pressure caused in the fuselage fuel tank TF, the central wing fuel tank TC, the left wing fuel tank TL, and the right wing fuel tank TR during supply of fuel or running of the engines E, E can be compensated for by air moving to and fro via the tank interconnect lines 55 and 56. In the case where an excessively low pressure or an excessively high pressure is generated for some reason, the vacuum relief valve 53 or the pressure relief valve 54 opens, thereby preventing damage to the fuel tanks.

When assembling the vent line 57 within the left main wing WL, among the eight pipes 57a to 57h forming the vent line 57, the inner six pipes 57b to 57g, which are aligned on a straight line, are assembled in advance by joining them by joints 68, the assembly is inserted through the access hole 65 provided in the partition 63a closest to the wing tip, and is made to run through the partitions 63b to 63f. Subsequently, the pipe 57a on the wing tip side and the branch line 60 are inserted through an opening from which the access panel 64a is removed, and assembled to the adjoining pipe 57b, and the pipe 57h on the wing root side is inserted through an opening from which the access panel 64f is removed, and assembled to the adjoining pipe 57g. Furthermore, the vent line 57 is fixed to the left wing fuel tank TL through the openings from which the access panels 64a to 64f are removed. Finally, the access panels 64a to 64f on the wing lower surface are fixed, the access panel 67 on the partition 63a on the wing tip side is fixed, and a wing tip member 69 is fixed to the outside of the access panel 67, thus completing the assembly of the vent line 57.

As described above, since the six pipes 57b to 57g forming a linear portion of the long vent line 57 are assembled in advance and inserted through the access hole 65 at the wing tip for installation, the workability greatly improves as compared with the case in which these pipes 57b to 57g are assembled through openings from which the access panels 64a to 64f on the wing lower surface are removed. Moreover, the improved workability can enhance the reliability of seals in the joined areas, thereby preventing air leakage. Furthermore, the size and the number of the access panels 64a to 64f on the wing lower surface can be reduced, thereby contributing to a reduction in the weight and the air resistance.

Although an embodiment of the present invention is explained above, the present invention can be modified in a variety of ways without departing from the scope thereof.

For example, the single central fuel tank 18 is provided between the wing tip fuel tank 17 and the wing root fuel tank 19 in the embodiment, but there can be a plurality of central fuel tanks 18.

Furthermore, the vent line 57 is illustrated as the wing pipeline in the embodiment, but the present invention can be applied to any wing pipeline such as a tank interconnect line of a vent system or a fuel passage of a fuel supply system.

Moreover, the wing pipeline that is inserted through the access hole 65 is not limited to one in which a plurality of pipes are joined in advance, and it may originally be one pipe.

What is claimed is:

1. An airplane fuel supply system comprising:
   a wing fuel tank formed from a wing tip fuel tank, a central fuel tank, and a wing root fuel tank which are disposed within an airplane main wing;
   a flapper valve that allows fuel movement from the wing tip fuel tank to the central fuel tank and restricts fuel movement in the opposite direction;
   another flapper valve that allows fuel movement from the central fuel tank to the wing root fuel tank and restricts fuel movement in the opposite direction;
   a collector tank that supplies fuel to an engine;
   a wing tip fuel pump that supplies fuel within the wing tip fuel tank to the collector tank;
   a central fuel pump that supplies fuel within the central fuel tank to the collector tank; and
   a wing root fuel pump that supplies fuel within the wing root fuel tank to the collector tank;
   wherein when the fuel delivery volume of the wing tip fuel pump is represented by Vt, the fuel delivery volume of the central fuel pump is represented by Vc, the fuel delivery volume of the wing root fuel pump is represented by Vr, and the fuel delivery volume from the collector tank to the engine is represented by Ve, the fuel delivery volumes Vt, Vc, Vr, and Ve are set so as to satisfy relationships Vr>Ve, Vt+Vc>Ve, and Vc<Ve.

2. The airplane fuel supply system according to claim 1 wherein the fuel delivery volumes Vt, Vc are set so as to satisfy a relationship Vt=Vc.

3. An airplane wing pipeline assembly method for assembling a wing pipeline that runs through a partition provided within a main wing of an airplane and extends in the span direction, the method comprising: inserting the wing pipeline in the span direction through an access hole provided in a wing tip, the wing pipeline being made into a linear unit in advance; and fixing the wing pipeline in a predetermined position.

* * * * *